(12) United States Patent
Ming

(10) Patent No.: US 10,571,736 B2
(45) Date of Patent: Feb. 25, 2020

(54) METHOD FOR MANUFACTURING ARRAY SUBSTRATE AND ARRAY SUBSTRATE

(71) Applicants: Shenzhen China Star Optoelectronics Technology Co., Ltd., Shenzhen (CN); Wuhan China Star Optoelectronics Technology Co., Ltd., Wuhan (CN)

(72) Inventor: Xing Ming, Shenzhen (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 14/897,656

(22) PCT Filed: Sep. 6, 2015

(86) PCT No.: PCT/CN2015/088961
§ 371 (c)(1),
(2) Date: Jun. 22, 2017

(87) PCT Pub. No.: WO2017/031779
PCT Pub. Date: Mar. 2, 2017

(65) Prior Publication Data
US 2018/0157106 A1    Jun. 7, 2018

(30) Foreign Application Priority Data
Aug. 25, 2015 (CN) .......................... 2015 1 0524659

(51) Int. Cl.
*G02F 1/1335* (2006.01)
*G02F 1/1362* (2006.01)
(Continued)

(52) U.S. Cl.
CPC ...... *G02F 1/133516* (2013.01); *G02F 1/0063* (2013.01); *G02F 1/1343* (2013.01);
(Continued)

(58) Field of Classification Search
CPC .................................. G02F 1/133516
See application file for complete search history.

(56) References Cited

U.S. PATENT DOCUMENTS

2004/0263752 A1* 12/2004 Kim .................. G02F 1/134363
                                                349/141
2005/0117093 A1*  6/2005 Kim .................. G02F 1/133514
                                                349/106
(Continued)

FOREIGN PATENT DOCUMENTS

CN      101196645 A      6/2008
CN      104503134 A      4/2015
(Continued)

OTHER PUBLICATIONS

Notification of Transmittal of the International Search Report and the Written Opinion of the International Searching Authority (Forms PCT/ISA/210, PCT/ISA/237, and PCT/ISA/220) dated May 24, 2016, by the State Intellectual Property Office of the People's Republic of China in corresponding International Application No. PCT/CN2015/088961. (12 pages).

(Continued)

*Primary Examiner* — Edmond C Lau
(74) *Attorney, Agent, or Firm* — Mintz Levin Cohn Ferris Glovsky and Popeo, P.C.; Steven M. Jensen

(57) ABSTRACT

A method for manufacturing an array substrate and an array substrate are disclosed. The method comprises the steps of forming a plurality of control electrodes on a baseplate, and forming a color-resist region between two adjacent control electrodes, wherein the color-resist region is a first color- (Continued)

resist region, a second color-resist region, a third color-resist region, and a fourth color-resist region in sequence; forming a first color-resist in the first color-resist region, forming a second color-resist in the second color-resist region, and forming a third color-resist in the third color-resist region; and coating the baseplate on which the control electrodes, the first color-resist, the second color-resist, and the third color-resist are formed and the fourth color-resist region with a transparent photoresist so as to form a flat layer. In the method according to the present disclosure, the production efficiency of the array substrate can be improved.

16 Claims, 3 Drawing Sheets

(51) Int. Cl.
  G02F 1/00 (2006.01)
  G02F 1/1343 (2006.01)
  G02F 1/1333 (2006.01)
(52) U.S. Cl.
  CPC ...... G02F 1/1362 (2013.01); G02F 1/133621 (2013.01); *G02F 2001/133357* (2013.01); *G02F 2001/136222* (2013.01); *G02F 2001/136231* (2013.01)

(56) References Cited

U.S. PATENT DOCUMENTS

| | | | |
|---|---|---|---|
| 2005/0134763 A1* | 6/2005 | Kang | G02F 1/133514 349/106 |
| 2006/0097414 A1* | 5/2006 | Chae | G02B 5/22 264/1.27 |
| 2008/0030833 A1* | 2/2008 | Park | G02F 1/133514 359/259 |
| 2015/0185551 A1 | 7/2015 | Kim et al. | |
| 2016/0209701 A1 | 7/2016 | Qin et al. | |
| 2016/0342018 A1 | 11/2016 | Xue et al. | |

FOREIGN PATENT DOCUMENTS

| | | |
|---|---|---|
| CN | 104678639 A | 6/2015 |
| CN | 104749814 A | 7/2015 |

OTHER PUBLICATIONS

Office Action dated Apr. 7, 2017, by the State Intellectual Property Office of People's Republic of China in corresponding Chinese Patent Application No. 20150524659.1. (7 pages).

* cited by examiner

METHOD FOR MANUFACTURING ARRAY SUBSTRATE AND ARRAY SUBSTRATE

CROSS REFERENCE TO RELATED APPLICATION

The present application claims priority of Chinese patent application CN201510524659.1, entitled "Method for Manufacturing Array Substrate and Array Substrate" and filed on Aug. 25, 2015, the entirety of which is incorporated herein by reference.

FIELD OF THE INVENTION

The present disclosure relates to the technical field of liquid crystal display, and particularly to a method for manufacturing array substrate and an array substrate.

BACKGROUND OF THE INVENTION

In four-color pixel technology, transparent pixel is added based on three-color pixel (i.e., red pixel, green pixel, and blue pixel) technology. According to three-color pixel technology, white light is generated through mixture of red light, green light, and blue light. According to four-color pixel technology, white light that is emitted by a backlight source can transmit through the transparent pixel directly. Therefore, a transmission rate of white light can be increased, i.e., the brightness of a liquid crystal display panel can be improved.

According to traditional four-color pixel technology, red pixel, green pixel, blue pixel, and transparent pixel are all formed on a color filter substrate, and the color filter substrate is coated with a transparent resin material to serve as a flat layer. On the one hand, the flat layer can serve as a protection layer of the pixels. On the other hand, the light which transmits through the transparent pixel can then transmit through the transparent material of the flat layer. However, during the manufacturing of the color filter substrate in the prior art, the flat layer is formed after red pixel, green pixel, blue pixel, and transparent pixel are manufactured, and thus the manufacturing procedure thereof is complicated. In addition, during the manufacturing of an array substrate and the color filter substrate, the flat layer should be formed on a surface of each color-resist of the color filter substrate and a surface of each control electrode of the array substrate respectively, and thus the flat layer needs to be manufactured through two procedures. As a result, the manufacturing procedure of the array substrate and the color filter substrate is increased, and the production efficiency thereof is reduced.

With respect to the aforesaid technical problem, a method for manufacturing an array substrate and an array substrate whereby the manufacturing procedure thereof can be reduced, and the production efficiency thereof can be improved are needed.

SUMMARY OF THE INVENTION

With respect to the technical defect in the prior art, the present disclosure provides a method for manufacturing an array substrate and an array substrate that is manufactured through this method.

The present disclosure provides a method for manufacturing an array substrate, which comprises the following steps:

forming a plurality of control electrodes on a baseplate, and forming a color-resist region between two adjacent control electrodes, wherein the color-resist region is a first color-resist region, a second color-resist region, a third color-resist region, and a fourth color-resist region in sequence;

forming a first color-resist in the first color-resist region, forming a second color-resist in the second color-resist region, and forming a third color-resist in the third color-resist region; and coating the baseplate on which the control electrodes, the first color-resist, the second color-resist, and the third color-resist are formed and the fourth color-resist region with a transparent photoresist so as to form a flat layer.

In the method for manufacturing the array substrate according to the present disclosure, the control electrodes and the color-resists each are formed on a same baseplate, and then the control electrodes, the color-resists, and the color-resist regions are coated with a transparent photoresist so as to form a flat layer. Compared with the prior art, in the method for manufacturing the array substrate according to the present disclosure, the flat layer does not need to be formed on a surface of each color-resist of the color filter substrate and a surface of each control electrode of the array substrate respectively, so that one manufacturing procedure of the flat layer can be saved, and the production efficiency thereof can be improved. In addition, in the method for manufacturing the array substrate according to the present disclosure, after the third color-resist is formed, the control electrode, the first color-resist, the second color-resist, the third color-resist, and the fourth color-resist region are coated with the transparent photoresist, and the color-resist in the fourth color-resist region does not need to be formed separately. That is, the color-resist in the fourth color-resist region is directly formed by the transparent photoresist. Therefore, one manufacturing procedure of the color-resist can be saved, and the production efficiency of the array substrate can be further improved.

According to some embodiments, a color-resist in the fourth color-resist region is formed by the flat layer directly. According to this technical solution, the color-resist in the fourth color-resist region does not need to be formed separately. That is, the color-resist in the fourth color-resist region is directly formed by the flat layer. Therefore, one manufacturing procedure of the color-resist in the fourth color-resist region can be saved.

According to some embodiments, the first color-resist, the second color-resist, and the third color-resist are red color-resist, green color-resist, and blue color-resist respectively. In this technical solution, the material of red color-resist, green color-resist, and blue color-resist can be selected according to actual needs. For example, within a wavelength of the light which can pass through a color-resist with a certain color, a color-resist material through which light of a certain wave band can pass can be selected. In this manner, a color gamut thereof can be enlarged, and a better image can be obtained.

According to some embodiments, the flat layer is preferably made of a transparent resin material. The transparent resin material can be a positive transparent photoresist material or a negative transparent photoresist material. A thickness of the flat layer preferably ranges from 1.5 µm to 5.5 µm. The flat layer, on the one hand, can flatten each of the color-resists and the control electrodes, and on the other hand, can protect them.

According to some embodiments, the method further comprises the following steps after the flat layer is formed:

forming a via hole in the flat layer; and forming a common electrode and a pixel electrode on the flat layer in sequence, wherein the pixel electrode is connected with the control electrode through the via hole. The control electrode is electrically connected with the pixel electrode through the via hole, so that the electronic control function of the array substrate can be realized.

According to some embodiments, a method for forming the control electrode comprises forming a gate, a source, and a drain in sequence, and the drain is connected with the pixel electrode. According to this technical solution, the drain is connected with the pixel electrode through the via hole arranged in the flat layer, so that the drain can be electrically connected with the pixel electrode.

The present disclosure further provides an array substrate, which comprises: a baseplate; a plurality of control electrodes that are arranged on the baseplate spaced from one another; a first color-resist region, a second color-resist region, a third color-resist region, and a fourth color-resist region each arranged between two adjacent control electrodes, wherein the first color-resist region, the second color-resist region, and the third color-resist region are provided with the first color-resist, the second color-resist, and the third color-resist respectively; and a flat layer which completely covers the first color-resist, the second color-resist, the third color-resist, and the fourth color-resist region.

In the array substrate according to the present disclosure, the control electrodes and the color-resists each are arranged on a same baseplate and are covered by a same flat layer. Compared with the array substrate in the prior art, in which the control electrodes and the color-resists are arranged on different baseplates, the production cost of the array substrate according to the present disclosure can be greatly reduced, and the production efficiency thereof can be improved accordingly. In addition, in the array substrate according to the present disclosure, the fourth color-resist region is completely made of the flat layer, and thus the color-resist in the fourth color-resist region does not need to be formed separately. Therefore, one manufacturing procedure of the color-resist can be saved, and the production efficiency of the array substrate can be further improved. Meanwhile, with respect to the array substrate according to the present disclosure, the fourth color-resist region can increase one kind of pixel to the array substrate, whereby the color gamut thereof can be enlarged, and the light transmission rate of the array substrate can be improved. That is, the brightness of the array substrate can be improved.

According to some embodiments, the first color-resist, the second color-resist, and the third color-resist are red color-resist, green color-resist, and blue color-resist respectively.

According to some embodiments, a color-resist in the fourth color-resist region is formed by the flat layer directly. According to this technical solution, the color-resist in the fourth color-resist region does not need to be formed separately, so that the manufacturing procedure of the array substrate can be simplified, and the production efficiency thereof can be improved.

Compared with the prior art, the present disclosure has the following advantages.

First, in the method for manufacturing the array substrate according to the present disclosure, the color-resists and the control electrodes are arranged on a same baseplate, so that the production cost of the array substrate can be greatly reduced, and the production efficiency thereof can be improved. At the same time, the alignment accuracy between the array substrate and the color filter substrate can be improved. That is, an aperture ratio of a liquid crystal display device which uses the array substrate can be improved.

Second, the flat layer completely covers the fourth color-resist region, and thus the color-resist in the fourth color-resist region is directly made of the flat layer. In this manner, the material of the color-resist when otherwise it is manufactured separately can be saved. At the same time, a transmissivity of light in the fourth color-resist region can be improved, and the brightness of the light which can pass through the array substrate can be improved.

Third, according to the method for manufacturing the array substrate disclosed herein, the manufacturing procedure of the array substrate can be significantly simplified, and the production efficiency thereof can be improved.

BRIEF DESCRIPTION OF THE DRAWINGS

The present disclosure will be illustrated in detail hereinafter with reference to the embodiments and the drawings. In the drawings.

Figure 1:
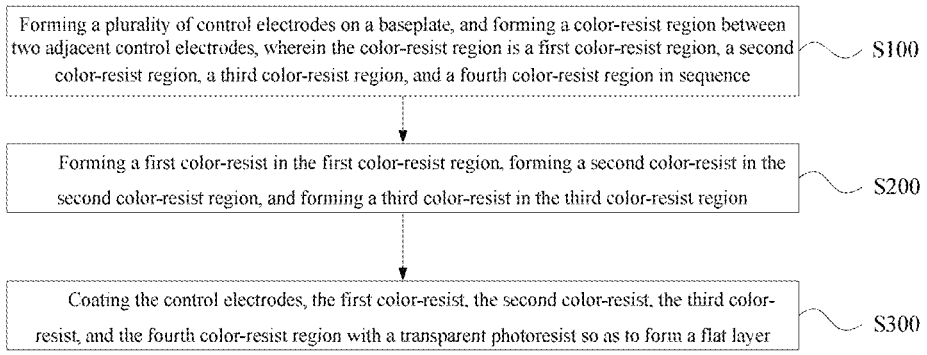
FIG. 1 is a flow chart of a method for manufacturing an array substrate according to the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

FIG. 1 is a flow chart of a method for manufacturing an array substrate according to the present disclosure. Here, amorphous silicon (a-Si) Fringe-Field Switching (FFS) technology is taken as an example. The method comprises the following steps.

Figure 2:
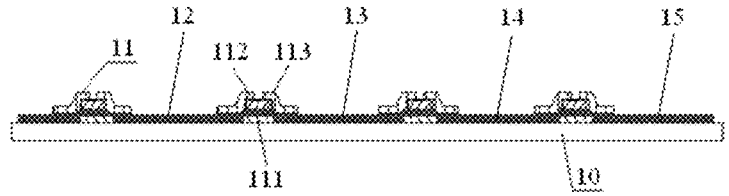
FIG. 2 schematically shows a step of forming a control electrode in the method for manufacturing the array substrate according to the present disclosure.

In step S100, as shown in FIG. 2, a plurality of control electrodes 11 are formed on a baseplate 10, and a color-resist region is formed between two adjacent control electrodes 11, wherein the color-resist region is a first color-resist region 12, a second color-resist region 13, a third color-resist region 14, and a fourth color-resist region 15 in sequence.

Figure 3:
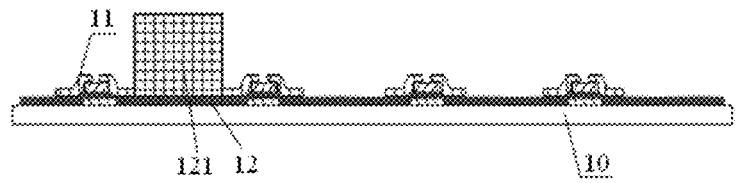
FIG. 3 schematically shows a step of forming a first color-resist in the method for manufacturing the array substrate according to the present disclosure.
Figure 4:
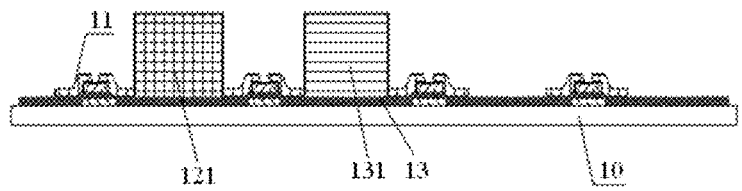
FIG. 4 schematically shows a step of forming a second color-resist in the method for manufacturing the array substrate according to the present disclosure.
Figure 5:
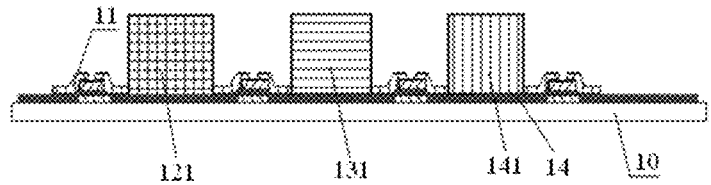
FIG. 5 schematically shows a step of forming a third color-resist in the method for manufacturing the array substrate according to the present disclosure.

In step S200, as shown in FIGS. 3 to 5, a first color-resist 121 is formed in the first color-resist region 12, a second color-resist 131 is formed in the second color-resist region 13, and a third color-resist 141 is formed in the third color-resist region 14. The first color-resist 121, the second color-resist 131, and the third color-resist 141 can be manufactured by a corresponding photomask through exposing, developing, and etching steps, which is the same as the manufacturing method in the prior art, and the details of which are no longer repeated here.

Figure 6:
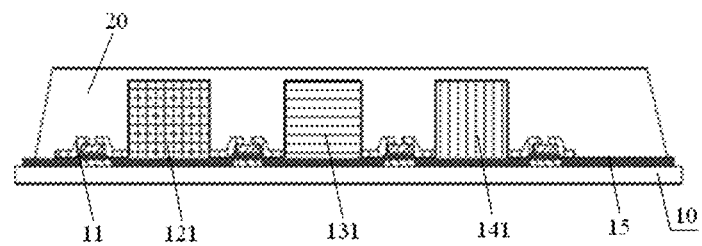
FIG. 6 schematically shows a step of forming a flat layer in the method for manufacturing the array substrate according to the present disclosure.

In step S300, as shown in FIG. 6, the baseplate 10 on which the control electrodes 11, the first color-resist 121, the second color-resist 131, and the third color-resist 141 are formed and the fourth color-resist region 15 are coated with a transparent photoresist so as to form a flat layer 20. The flat layer 20 is preferably made of a transparent resin material.

In the method for manufacturing the array substrate according to the present disclosure, the control electrodes 11 and the color-resists each are formed on a same baseplate 10, and then the control electrodes 11, the color-resists, and the color-resist regions are coated with a transparent photoresist so as to form a flat layer 20. Compared with the prior art, in the method for manufacturing the array substrate according to the present disclosure, the flat layer does not need to be formed on a surface of each color-resist of the color filter substrate and a surface of each control electrode of the array substrate respectively, so that one manufacturing procedure of the flat layer can be saved, and the production efficiency thereof can be improved. In addition, in the method for manufacturing the array substrate according to the present disclosure, after the third color-resist 141 is formed, the control electrode 11, the first color-resist 121, the second color-resist 131, the third color-resist 141, and the fourth color-resist region 15 are coated with the transparent photoresist, and the color-resist in the fourth color-resist region 15 does not need to be formed separately. That is, the color-resist in the fourth color-resist region is directly formed by the transparent photoresist. Therefore, one manufacturing procedure of the color-resist can be saved, and the production efficiency of the array substrate can be further improved.

According to the present disclosure, the color-resist in the fourth color-resist region 15 is formed by the flat layer 20 directly. According to this technical solution, the color-resist in the fourth color-resist region 15 does not need to be formed separately. That is, the color-resist in the fourth color-resist region 15 is directly formed by the flat layer 20. Therefore, one manufacturing procedure of the color-resist in the fourth color-resist region 15 can be saved.

Preferably, the first color-resist 121, the second color-resist 131, and the third color-resist 141 are red color-resist, green color-resist, and blue color-resist respectively. In this technical solution, the material of red color-resist, green color-resist, and blue color-resist can be selected according to actual needs. For example, within a wavelength of the light which can pass through a color-resist with a certain color, a color-resist material through which light of a certain wave band can pass can be selected. In this manner, a color gamut thereof can be enlarged, and a better image can be obtained.

According to the present disclosure, the flat layer 20 can be made of a positive transparent photoresist material or a negative transparent photoresist material. A thickness of the flat layer preferably ranges from 1.5 μm to 5.5 μm. The flat layer 20, on the one hand, can flatten each of the color-resists and the control electrodes 11, and on the other hand, can protect them.

Figure 7:
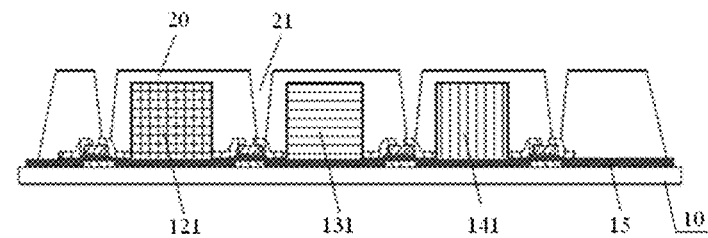
FIG. 7 schematically shows a step of forming a via hole in the flat layer in the method for manufacturing the array substrate according to the present disclosure.
Figure 8:
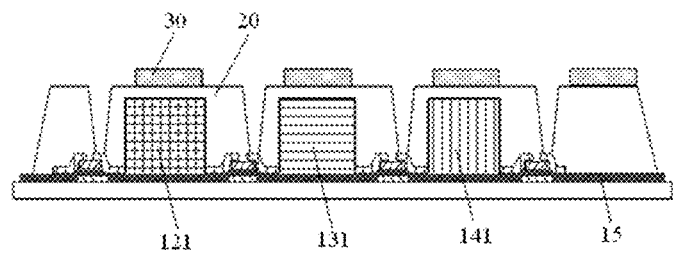
FIG. 8 schematically shows a step of forming a common electrode in the method for manufacturing the array substrate according to the present disclosure.
Figure 9:
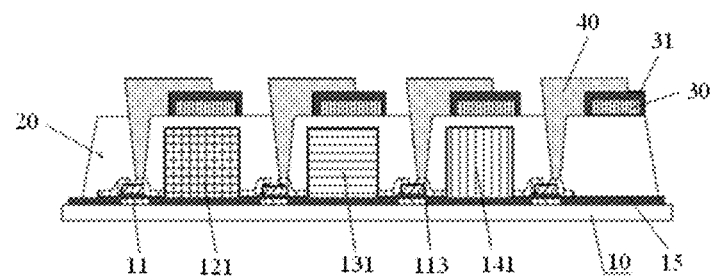
FIG. 9 schematically shows a step of forming a pixel electrode in the method for manufacturing the array substrate according to the present disclosure.

According to the present disclosure, as shown in FIGS. 7 to 9, the method further comprises the following steps after the flat layer 20 is formed:

as shown in FIG. 7, a via hole 21 is formed in the flat layer 20; and as shown in FIGS. 8 and 9, a common electrode 30 and a pixel electrode 40 are formed on the flat layer 20 in sequence, wherein the pixel electrode 40 is connected with the control electrode 11 through the via hole 21. The control electrode 11 is electrically connected with the pixel electrode 40 through the via hole 21, so that the electronic control function of the array substrate can be realized. In this step, the common electrode 30, an insulation layer 31, and the pixel electrode 40 can be manufactured with the method in the prior art, and the details of which are no longer repeated here.

In addition, according to the present disclosure, as shown in FIG. 2, a method for forming the control electrode 11 comprises forming a gate 111, a source 112, and a drain 113 in sequence. First, the gate 111 and a gate signal line is formed on the baseplate 10. Second, an amorphous silicon active layer is formed on the gate 111. Third, after the active layer is formed, the source 112, the drain 113, and the corresponding signal lines are formed. The three manufacturing procedures are the same as those in the prior art, and the details of which are no longer repeated here. Specifically, the pixel electrode 40 is electrically connected with the drain 113.

Figure 10:
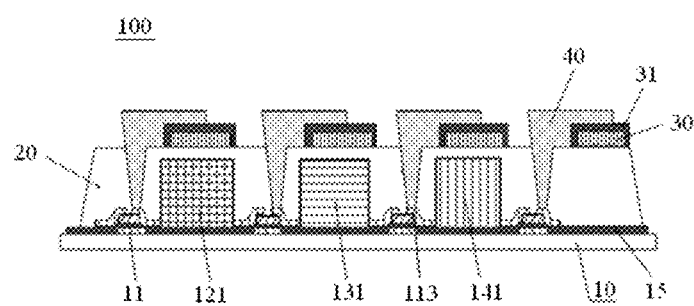
FIG. 10 schematically shows a structure of an array substrate according to the present disclosure.

FIG. 10 schematically shows a structure of an array substrate 100 according to the present disclosure. The array substrate 100 comprises a baseplate 10; a plurality of control electrodes 11 that are arranged on the baseplate 10 spaced from one another; a first color-resist region 12, a second color-resist region 13, a third color-resist region 14, and a fourth color-resist region 15 each arranged between two adjacent control electrodes 11 (as shown in FIG. 2), wherein the first color-resist region 12, the second color-resist region 13, and the third color-resist region 14 are provided with the first color-resist 121, the second color-resist 131, and the third color-resist 141 respectively; and a flat layer 20 which completely covers the first color-resist 121, the second color-resist 131, the third color-resist 141, and the fourth color-resist region 15.

In the array substrate 100 according to the present disclosure, the control electrodes 11 and the color-resists each are arranged on a same baseplate 10 and are covered by a same flat layer 20. Compared with the array substrate in the prior art, in which the control electrodes and the color-resists are arranged on different baseplates, the production cost of the array substrate according to the present disclosure can be greatly reduced, and the production efficiency thereof can be improved accordingly. In addition, in the array substrate 100 according to the present disclosure, the fourth color-resist region 15 is completely made of the flat layer 20, and thus the color-resist in the fourth color-resist region 15 does not need to be formed separately. Therefore, one manufacturing procedure of the color-resist can be saved, and the production efficiency of the array substrate 100 can be further improved. Meanwhile, with respect to the array substrate 100 according to the present disclosure, the fourth color-resist region 15 can increase one kind of pixel to the array substrate 100, whereby the color gamut thereof can be enlarged, and the light transmission rate of the array substrate 100 can be improved. That is, the brightness of the array substrate 100 can be improved.

Preferably, the first color-resist 121, the second color-resist 131, and the third color-resist 141 are red color-resist, green color-resist, and blue color-resist respectively.

In the array substrate 100 according to the present disclosure, the color-resist in the fourth color-resist region 15 is formed by the flat layer 20 directly. According to this technical solution, the color-resist in the fourth color-resist region 15 does not need to be formed separately, so that the manufacturing procedure of the array substrate 100 can be simplified, and the production efficiency thereof can be improved.

It can be understood that, since the array substrate disclosed herein comprises the color-resists and the control electrodes 11, only black matrix and spacers need to be made when the color filter substrate is manufactured during the following procedure. Preferably, the black matrix layer can also be formed on the array substrate 100. For example, the black matrix layer can be formed in step S100 after the color-resists are formed. With this arrangement, an alignment error between the array substrate and the color filter substrate can be compensated, and an alignment accuracy between the array substrate and the color filter substrate can be improved.

The array substrate 100 disclosed herein can be used in a variety of display fields and display technologies. For example, the array substrate 100 can be used in mobile display field and large sized display field as well as in the designing of Low Temperature Poly-Silicon (LTPS) and amorphous silicon (a-Si) products. The array substrate can be used in products with Fringe-Field Switching (FFS), Twisted Nematic (TN), Vertical Alignment (VA), and In-Plane Switching (IPS) structures. In addition, the array substrate can also be used in the products with in cell touch structure and in the four-color pixel display technology.

It should be noted that, the above embodiments are described only for better understanding, rather than restricting the present disclosure. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A method for manufacturing an array substrate, comprising the following steps:
    forming a plurality of control electrodes on a baseplate, and forming a color-resist region between two adjacent control electrodes, wherein the color-resist region is a first color-resist region, a second color-resist region, a third color-resist region, and a fourth color-resist region in sequence;
    forming a first color-resist in the first color-resist region, forming a second color-resist in the second color-resist region, and forming a third color-resist in the third color-resist region; and
    forming a fourth color-resist by coating the baseplate on which the control electrodes, the first color-resist, the second color-resist, and the third color-resist are formed and the fourth color-resist region with a transparent photoresist so as to form a flat layer such that the transparent photoresist forms a flat top surface across the first color-resist, the second color-resist, the third color-resist, and the fourth color-resist,
    wherein an entirety of the flat layer is made by coating a single material in one step.

2. The method according to claim 1, wherein a color-resist in the fourth color-resist region is formed by the flat layer directly.

3. The method according to claim 1, wherein the first color-resist, the second color-resist, and the third color-resist are red color-resist, green color-resist, and blue color-resist respectively.

4. The method according to claim 2, wherein the first color-resist, the second color-resist, and the third color-resist are red color-resist, green color-resist, and blue color-resist respectively.

5. The method according to claim 1, wherein the flat layer is made of a transparent resin material.

6. The method according to claim 2, wherein the flat layer is made of a transparent resin material.

7. The method according to claim 1, wherein a thickness of the flat layer ranges from 1.5 μm to 5.5 μm.

8. The method according to claim 2, wherein a thickness of the flat layer ranges from 1.5 μm to 5.5 μm.

9. The method according to claim 1, further comprising the following steps after the flat layer is formed:
    forming a via hole in the flat layer; and
    forming a common electrode and a pixel electrode on the flat layer in sequence, wherein the pixel electrode is connected with the control electrode through the via hole.

10. The method according to claim 2, further comprising the following steps after the flat layer is formed:
    forming a via hole in the flat layer; and
    forming a common electrode and a pixel electrode on the flat layer in sequence, wherein the pixel electrode is connected with the control electrode through the via hole.

11. The method according to claim 9, wherein a method for forming the control electrode comprises forming a gate, a source, and a drain in sequence, and the drain is connected with the pixel electrode.

12. The method according to claim 10, wherein a method for forming the control electrode comprises forming a gate, a source, and a drain in sequence, and the drain is connected with the pixel electrode.

13. An array substrate, comprising:
    a baseplate;
    a plurality of control electrodes that are arranged on the baseplate spaced from one another;
    a first color-resist region, a second color-resist region, a third color-resist region, and a fourth color-resist region each arranged between two adjacent control electrodes, wherein the first color-resist region, the second color-resist region, and the third color-resist region are provided with a first color-resist, a second color-resist, and a third color-resist respectively; and a flat layer which completely covers the first color-resist, the second color-resist, the third color-resist, and the fourth color-resist region,
wherein an entirety of the flat layer is made of a single material of transparent resin coated in one step.

14. The array substrate according to claim 13, wherein the first color-resist, the second color-resist, and the third color-resist are red color-resist, green color-resist, and blue color-resist respectively.

15. The array substrate according to claim 13, wherein a color-resist in the fourth color-resist region is formed by the flat layer directly.

16. The array substrate according to claim 14, wherein a color-resist in the fourth color-resist region is formed by the flat layer directly.

* * * * *